Aug. 26, 1941.   F. M. CLARK   2,253,506
ELECTROLYTE COMPOSITION
Filed Dec. 31, 1938
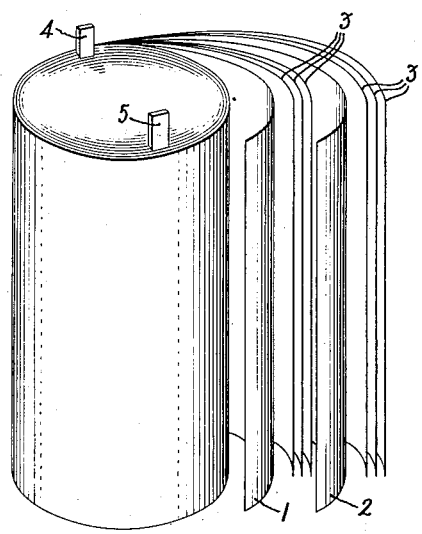
CONTAINS POLYHYDROXY ETHER AND IONOGEN
Inventor:
Frank M. Clark,
by Harry E. Dunham
His Attorney.

Patented Aug. 26, 1941

2,253,506

UNITED STATES PATENT OFFICE 2,253,506

ELECTROLYTE COMPOSITION

Frank M. Clark, Pittsfield, Mass., assignor to General Electric Company, a corporation of New York Application December 31, 1938, Serial No. 248,762

10 Claims. (Cl. 175—315)

The present invention constitutes an improvement in electric capacitors of the electrolytic type, and its object is to provide capacitors which in their manufacture are completely and easily impregnated with electrolyte and which will have a high degree of stability when operated at temperatures well above ordinary room temperature, and will have a relatively low power factor over the entire range of operating temperatures.

In accordance with my invention I have provided electrolytic capacitors which contain as electrolyte a clear, suspension-free solution of a suitable ionogen in a water-soluble polyhydroxy ether such, for example, as dihydroxy diethyl ether (also known as diethylene glycol), having the chemical formula $(CH_2OH-CH_2)_2O$. The solution may contain an appreciable amount up to 5 per cent of water.

The accompanying drawing illustrates in side elevation a roll type capacitor for use in which my improved composition is adapted.

The capacitor shown in the drawing comprises cooperating armatures 1, 2 consisting of aluminum foil or other suitable material. The foil advantageously, but not necessarily, may be etched and formed (or filmed) in accordance with known practice.

Between the armatures is a spacer 3 consisting of paper or other suitable spacing material. For example, three sheets of kraft paper of about .001 inch thickness may be used although my invention is not restricted to this particular kind of paper nor any specific member of layers. Terminal connectors 4, 5 are provided as usual. The enclosing casing has not been shown in order to simplify the drawing.

Heretofore electrolytes comprising the glycol borate type of compound has been suggested for electrolytic capacitor use. Such electrolytes in practical use are cheese-like solid compositions, the glycol borate being formed by the reaction of boric acid and glycol at temperatures of 130° C. or higher. They are not clear solutions even at the highest temperatures normally used in the impregnation of the capacitor winding. In many instances it has been found necessary to apply such electrolytes by mechanically spreading the electrolyte on the spacing material as with a blade. The electrolytes embodying the present invention are clear solutions of the ionogen which remain liquid even at the lowest temperature to which capacitors ordinarily are exposed. Consequently, the electrolyte solution may be easily pumped thus facilitating circulation in an impregnation apparatus. Because of its freedom from suspended matter it completely and quickly impregnates the capacitor assembly, thereby insuring a uniformity of electrical characteristics and stability at all temperatures to which it will normally be subjected during service use.

My improved electrolyte composition is a simple solution of a suitable ionogen in a water-soluble hydroxy ether, the ionogen constituting preferably about 1 to 25 per cent by weight of the hydroxy ether compound, the exact proportion depending on the hydroxy ether selected as the solvent and the type and value of voltage to which the treated capacitor is to be subjected.

Diethylene glycol, which is a dihydroxy mono ether, is preferred as the solvent medium. It has a boiling point of about 244° C., a freezing point of —10.4° C., and a specific gravity (15° C. referred to water at 15° C.) of 1.1212. The hydroxyl ethers have a relatively high electrical resistance which is suited for modification to a desired lower value by the simple solution therein of the chosen ionogen.

As ionogen I may employ a borate, oxalate, citrate, tartrate, acetate, or a phosphate salt of an alkali radical (including ammonium). Although from the standpoint of stability at high idling temperature the sodium, potassium or ammonium salts of the tartaric, phosphoric, acetic, boric, citric or oxalic acids all have been found to be useful, I prefer the ammonium salt. This salt is well adapted for even the highest alternating or direct current voltages normally applied to capacitors of this type. They are well adapted for use on circuits charged to approximately 220 volts A. C. or to 400 to 500 volts D. C. For 110 volt alternating current application, capacitors treated with an electrolyte solution of dihydroxy diethyl ether containing about 20 per cent ammonium borate and several per cent of water are of particular utility.

Solution of the ionogen in the ether may be promoted by heating the ether to a temperature of about 100° C., which, however, is not sufficiently high to cause chemical reaction between the liquid and the ionogen.

The electrolyte composition can be prepared by causing chemical combination between boric acid and ammonia in the presence of the hydroxy ether. For example, a solution by weight of 20 parts of boric acid in 80 parts of the ether is treated with gaseous ammonia ($NH_3$) until neutral or slightly alkaline condition (pH=7 to 7.4) is obtained. This treatment results in the formation and solution of hydrated ammonium borate in the ether. The presence in the final product of the water formed during the reaction is not objectionable. The electrolyte may contain as much as 5 per cent water. It is preferred, however, for reasons of manufacturing utility, that the amount of water present should be controlled between optimum limits. Water content ranging from about 3 to 5 per cent has been found to be suitable. The ammonium borate, or other chosen ionogen, also may be introduced into the dissolving medium in a previously formed state, the crystalline material of course being associated with water of crystallization.

The hydrated ionogen should not be in excess of the amount which the polyhydroxy ether will retain in solution at the ordinary temperatures to which it may be exposed in use, that is, no crystallization of ionogen will occur in the solution over the range of operating temperatures. The product should be a clear, limpid, and somewhat oily liquid having a water-white or pale amber color. At room temperature it does not show the presence of excess undissolved crystalline material. The borate of the polyhydroxy ether is not formed by either method of preparation as part of the electrolyte. As heretofore stated, the formation of such a compound would result in an increased viscosity and a tendency toward a putty or cheeselike physical state together with an increase in resistance of the electrolyte. These factors increase the difficulty of efficient capacitor impregnation and give increased electrical losses to the treated capacitor. Formation of such compounds should be avoided by maintaining the electrolyte in a neutral or preferably slightly alkaline state, thus avoiding the possible reaction between the hydroxy ether compound and acidic materials. In factory practice contaminated electrolyte is easily recovered by the simple vacuum distillation of the hydroxy ether solvent.

Changes in the electrolyte normally involve the evaporation of water, the course of which is easily followed by refractive index measurements. The loss of water to the point that the ionogen salt begins to be dehydrated is manifested either by increased resistance or the precipitation of the dehydrated crystals from solution. Water then may be added in quantities determined by refractive index measurements. Evaporation records, visual inspection, and refractive index measurements are adequate safeguards against the possible formation of the borate derivative of the hydroxy compound.

In the place of the dihydroxy ether which has been used to illustrate this invention, I may use a variety of water-soluble hydroxy ethers, either alone or in combination with one another. Examples of suitable alternative ether solvents are the following:

Polyhydroxy ethers 2,3 dihydroxy propyl methyl ether, a liquid boiling at 196° C. under 128 mm. of mercury.

2,4 dihydroxy butyl methyl ether, a liquid boiling at 121° C. under 12 mm. of mercury.

2,4 dihydroxy butyl ethyl ether, a liquid boiling at 210° C.

The symmetrical di($\beta$ hydroxy ethoxy) ethane is of particular utility in many of the higher voltage electrolytic capacitors. Because of its resemblance to the glycol residue this material is often referred to as triethylene glycol and has the structural formula:

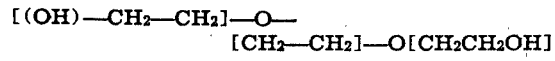

This material is a liquid boiling at 290° C. and with a specific gravity of 1.11 at 20° C. When compounded with ionogen of the type including the oxalate, acetate, phosphate, borate, tartrate, or citrate, high resistant, clear electrolytes suitable for high voltage direct or alternating current application are obtained. Thus, an electrolyte containing 10 per cent ammonium borate and 90 per cent of this poly-ether is a clear solution having a resistance at 90° C. of approximately 1230 ohms cm. cu. Capacitors treated with this product are characterized with low losses at 220 volts and exhibit at 100° C. a marked stability on an idling (shelf) test.

Further advantages may be obtained by the use of my improved electrolytes in composition comprising combinations of ethers. Any value of electrolyte resistance is available by properly selecting the hydroxy ethers. For example, a blend of solution of 10 per cent ammonium borate or phosphate ionogen in a mixture containing equal amounts by weight of sym. di($\beta$ hydroxy ethoxy) ethane and $\beta\beta'$ dihydroxy diethyl ether is of utility for the intermediate voltages between 110 and 220 volts alternating current or 200 and 400 volts direct current. The sym. di($\beta$ hydroxy ethoxy) ethane can also be blended with ethylene glycol in order to produce a capacitor suited for 110 volts alternating current circuits. For example, proper electrolyte resistance is obtained for such application by blending equal parts by weight of ethylene glycol, which is characterized by low resistance, and the higher-resistant sym. di($\beta$ hydroxy ethoxy) ethane. Such a mixture containing 20 per cent by weight of ammonium borate is a clear solution with a resistance well adapted for use in electrolytic capacitors intended for 110 volt A. C. application. When used in the standard oxidized foil capacitor construction this electrolyte gives power factor at 110 volts alternating current of less than 6 per cent with the normally high capacity value and marked stability on shelf and voltage tests. In an application Serial No. 316,793, filed February 1, 1940 as a continuation-in-part of the present application, claims are made to compositions of polyhydroxy ethers and resistance modifiers, such as ethylene glycol.

The rolled assembly of capacitor armature foil and spacer (or other suitable capacitor assembly) is impregnated with a solution of the hydroxy ether and ionogen by known methods. For example, the liquid electrolyte may be caused to impregnate the assembly while held in contact therewith under pressure at a temperature of about 75° to 100° C. for from one-half to one or more hours. The impregnated units finally are sealed into containers.

110 volt A. C. capacitors so made in their most compact state have an average capacity of about 5 to 8 microfarads per 10 square inches of armature surface and operate initially at 25° C. with a power factor of about 6 to 7 per cent.

In general, it may be said that capacitors embodying my invention are remarkably stable when subjected to elevated temperatures. Experience has indicated that ordinarily capacitors are adversely affected by subjection to elevated temperatures while idle. Capacitors made as herein described when kept at 100° C. for long idle periods of time show substantially no film deterioration. One of the indications of deterioration is a temporary increase in capacity. The present capacitors have shown a substantially stable capacity even when maintained idle for 125 days at 100° C. The power factor (measure of energy loss) is substantially stable over operating temperatures ranging from 25 to 100° C. and after long idle periods at 100° C. The highest degree of stability is obtained with a concentration of ionogen of about 10 per cent.

What I claim as new and desire to secure by Letters Patent of the United States is:

1. A liquid electrolyte composition suitable for use in capacitors which consists substantially of liquid dihydroxy ether and an ionogen in an uncombined state, the amount of ionogen in said composition being no greater than the maximum amount which is capable of being dissolved in said ether.

2. A liquid electrolyte composition suitable for use in capacitors and which is liquid at temperatures to which capacitors normally are exposed consisting of water-soluble polyhydroxy ether having a hydrated ionogen dissolved therein, the amount of ionogen being such that crystallization will not occur over the range of operating temperatures.

3. A liquid composition suitable for impregnating electrolytic capacitors consisting of a liquid dihydroxy ether, about 1 to 25 per cent by weight of an ionogen dissolved in said ether, and up to 5% of water.

4. A liquid composition suitable for impregnating electrolytic capacitors consisting of a dihydroxy mono ether having ammonium borate dissolved therein.

5. A liquid electrolyte composition suitable for electric capacitors consisting of diethylene glycol and hydrated ammonium borate dissolved therein, said borate constituting about 10 to 20 per cent by weight of said ether.

6. A liquid capacitor electrolyte consisting essentially of diethylene glycol and containing by weight about 3 to 5 per cent of water and about 20 per cent of ammonium borate, said borate being dissolved in said glycol in an uncombined state.

7. In an electrolytic capacitor comprising filmed aluminum armatures and interposed paper spacer, a liquid impregnating composition therein consisting of at least one water-soluble polyhydroxy ether compound which contains in solution both up to about 5 per cent water and an ionogen consisting of a salt of an alkali, the quantity of ionogen being no greater than the maximum amount which is soluble in said ether compound.

8. In an electrolytic capacitor comprising filmed aluminum armatures and interposed paper spacer, a liquid impregnating composition therein consisting of at least one water-soluble polyhydroxy ether compound which contains in solution about 3 to 5 per cent water and about 10 to 20 per cent of uncombined ammonium borate.

9. In an electrolytic capacitor comprising filmed aluminum armatures and interposed sheets of kraft paper, a liquid electrolyte which permeates said paper and consists of liquid diethylene glycol containing in simple solution about 20 per cent of uncombined ammonium borate and about 3 to 5 per cent of water.

10. A liquid electrolyte suitable for the impregnation of electrolytic capacitors consisting of a solution of an ionogen in diethylene glycol, the amount of ionogen in said electrolyte being no greater than the maximum amount which is capable of being dissolved in said diethylene glycol.

FRANK M. CLARK.